Feb. 26, 1935. LE ROY H. FONTAN 1,992,657
SHAKER RACK
Filed July 3, 1934
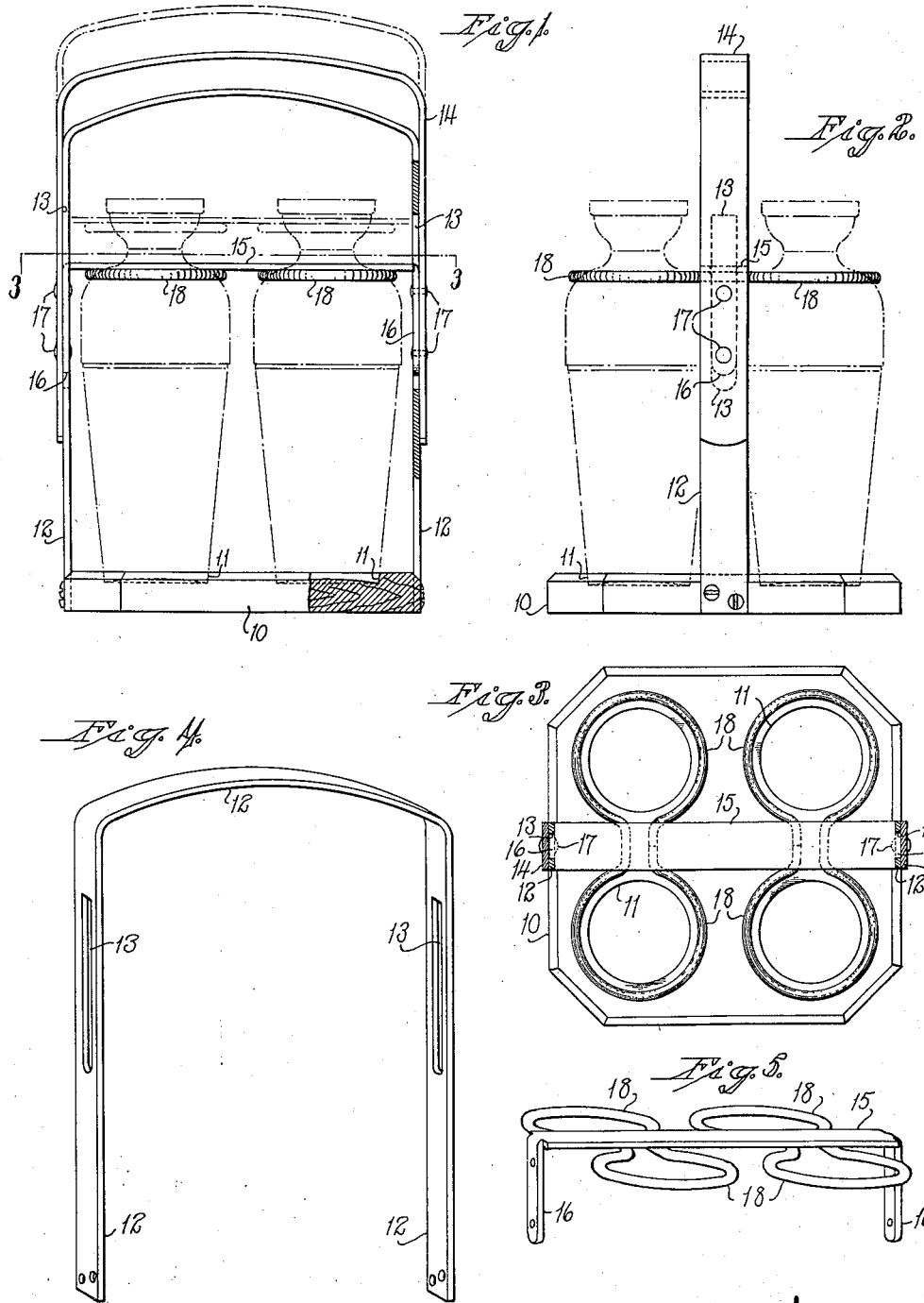

Patented Feb. 26, 1935

1,992,657

UNITED STATES PATENT OFFICE 1,992,657

SHAKER RACK

Le Roy H. Fontan, Rutherford, N. J., assignor to The Napier Company, Meriden, Conn., a corporation Application July 3, 1934, Serial No. 733,585

3 Claims. (Cl. 259—54)

This invention relates to an improvement in shaker racks particularly adapted for mixing cocktails. It often happens that in mixing cocktails for a party, it is desirable to mix two or more kinds, and the object of this invention is to provide a rack by which a plurality of shakers may be conveniently held and shaken at the same time, and the invention consists in the construction as hereinafter described and particularly recited in the claims.

In the accompanying drawing:

Fig. 1 is a front view of a shaker rack constructed in accordance with my invention;

Fig. 2 is a side view of the same;

Fig. 3 is a sectional view on the line 3—3 of Fig. 1;

Fig. 4 is a perspective view of the bail, detached; and

Fig. 5 is a perspective view of the shaker loop member, detached.

In carrying out my invention, I employ a base 10 which may be of wood or metal and of the desired outline and formed in its upper face with recesses 11. To opposite sides of the base is fixed a bail 12 which is formed on opposite sides with slots 13. Setting over the bail 12 and corresponding in form therewith is a yoke 14, and secured to the said yoke 14 between its sides is a bar 15 having downwardly-extending arms 16 which ride in the slots 13 and which are secured to the yoke by rivets 17, and carried by the bar 15 are loops 18 located in line with the recesses 11 in the base and adapted to set over the tops of shakers seated in the recesses. The yoke, being movable, provides for the ready insertion or removal of the shakers, but when pressed down will hold the shakers firmly in position, and this pressure is applied by grasping the upper portion of the bail and yoke in one hand. The natural position applies the necessary pressure upon the loops to hold the shakers in position. Preferably and as shown, the yoke is normally spaced above the top of the bail to permit the ready insertion of the fingers between them to lift the yoke to release the shakers. These devices may be made in any desired size to accommodate as many shakers as desired.

The invention may be carried out in other specific ways than that herein set forth without departing from the spirit and essential characteristics of the invention, and the present embodiment is, therefore, to be considered in all respects as illustrative and not restrictive, and all changes coming within the meaning and equivalency range of the appended claims are intended to be embraced therein.

I claim:

1. A shaker rack comprising a base, a bail connected with opposite sides of said base, a yoke setting over said bail and slidable toward and from said base, and loops below said bail and carried by the said yoke and movable therewith, said bail and yoke being adapted to be grasped in a single hand, and when so grasped, to cause said yoke and loops to move toward said base.

2. A shaker rack comprising a base and a bail, the sides of the bail formed with vertical slots, a yoke setting over said bail and slidable toward and from said base, a bar connected with the yoke, said bar having arms extending into said slots, and a plurality of loops carried by said bar, said bail and yoke being adapted to be grasped in a single hand, and when so grasped, to cause said yoke and loops to move toward said base.

3. A shaker rack comprising a base and a bail, the said base formed in its upper face with recesses, the sides of the bail formed with vertical slots, a yoke setting over said bail, a bar connected with the yoke, said bar having arms extending into said slots, and a plurality of loops carried by said bar.

LE ROY H. FONTAN.